United States Patent Office 3,518,201
Patented June 30, 1970

3,518,201
CHLORINE RELEASE DETERGENT COMPOSITION WITH IMPROVED DEFOAMER STABILITY
Forrest Ashton Wessells, Baltimore, Md., assignor to W. R. Grace & Co., a corporation of Connecticut
No Drawing. Continuation-in-part of application Ser. No. 585,771, Oct. 11, 1966. This application Sept. 4, 1969, Ser. No. 855,386
Int. Cl. C11d 7/56
U.S. Cl. 252—99         5 Claims

ABSTRACT OF THE DISCLOSURE

A detergent composition is disclosed having chlorine release with improved defoaming agent stability. The detergent composition, particularly suitable for dishwashing, contains as essential ingredients a chlorine degradable polyethenoxy nonionic surfactant defoaming agent, a chlorine release agent, and sodium metasilicate pentahydrate.

This application for U.S. Letters Patent is a continuation-in-part of application Ser. No. 585,771, filed Oct. 11, 1966, now abandoned.

The present invention relates to a method for preparing a new detergent composition having chlorine release with improved defoaming agent stability. The detergent composition useful for dishwashing contains as essential ingredients, a chlorine degradable polyethenoxy nonionic surfactant defoaming agent, a chlorine release agent and sodium metasilicate pentahydrate.

Dishwashing detergent compositions containing a defoaming agent, sodium metasilicate pentahydrate, soda ash, sodium tripolyphosphate, calcium silicate, and chlorinated trisodium phosphate are known to the art. The prior art compositions containing a chlorine degradable defoaming agent and chlorinated trisodium phosphate have been found, upon prolonged storage, to be unstable. The defoaming capability of the defoaming component and the available chlorine generated from the chlorinated trisodium phosphate usually greatly decrease. Although it is desirable to have both of these ingredients in a single detergent composition, use of separate compositions containing a chlorine degradable component and a chlorine releasing component has been required to avoid degradation.

It has now been found that by practice of the present invention and in contrast to the experience of the prior art, a detergent composition containing a chlorine release agent and a chlorine degradable defoaming agent may be prepared which exhibits greatly improved stability upon prolonged storage. The present detergent composition is prepared by melting together sodium metasilicate pentahydrate and the chlorine degradable defoaming agent. The friability of the solidified melt is improved by adding a nucleating agent such as a soda ash and/or a condensed phosphate to the melt composition.

Generally stated, the detergent composition of this invention having improved defoamer stability consists essentially of a composition formed by melting a mixture containing from 5 to 45 percent sodium metasilicate and from 0.5 to 4 percent of a chlorine degradable polyethenoxy nonionic surfactant defoaming agent, based on the weight of the final composition. Preferably, the melt mixture contains at least one nucleating agent in a quantity sufficient to provide a friable mass on cooling of the melt. The melt mixture may contain, as nucleating agents, from 0 to 20 percent soda ash and from 0 to 25 percent of a water-soluble condensed phosphate, based on the weight of the final composition. The final mixture may also contain in addition to quantities of the above ingredients, added amounts of soda ash, water-soluble condensed phosphate, chlorine release agent, and calcium silicate to provide a composition having the following essential ingredients, expressed as weight percents.

Ingredients:
- Sodium metasilicate pentahydrate _____ 5–45
- Chlorine degradable polyethenoxy nonionic surfactant defoaming agent _____ 0.5–4
- Soda ash _____ 0–40
- Water-soluble condensed phosphate _____ 0–60
- Calcium silicate _____ 0–2
- Chlorine release agent, as available chlorine __ 1–5

The method of this invention requires forming a melt by heating sodium metasilicate pentahydrate, the chlorine degradable defoaming agent, and if desired, a small amount of a nucleating agent, at a temperature of from 65 to 100° C. and solidifying the melt by cooling. The solidified melt is then mixed with a chlorine release agent and other ingredients as desired in the final composition.

The mixture to be melted contains the following essential ingredients, expressed as weight percents of the final composition:

| Component | Operable | Preferred |
|---|---|---|
| Sodium metasilicate pentahydrate | 5–45 | 10–30 |
| Chlorine degradable polyethenoxy nonionic surfactant defoaming agent | 0.5–4 | 1–2 |
| Nucleating agent | 0–25 | 0–20 |

Preferably, as nucleating agent, from 0 to 10 weight percent of a condensed phosphate and from 0 to 10 weight percent of soda ash are present in the melt mixture. Only a portion of or all of the above ingredients desired in the final composition may be introduced in the melt mixture. Preferably, all of the chlorine degradable defoaming agent desired in the final product is introduced into the melt mixture. The essential ingredients in the melt mixture are sodium metasilicate pentahydrate which has a melting temperature within the range of from 60 to 70° C. and the chlorine degradable polyethenoxy nonionic surfactant defoaming agent.

Preferably, the melt mixture also contains a small amount of at least one nucleating agent. The term "nucleating agent" includes compounds which nucleate or promote crystal formation of the melt upon cooling. Compounds suitable for this use, in general, have a melting point above about 80° C. and, if soluble in molten sodium metasilicate pentahydrate, must crystallize before the sodium metasilicate solidifies upon cooling. The nucleating agents are preferably compounds which are generally used in detergents of this type and include materials such as soda ash, water-soluble condensed alkali metal phosphates, sodium sulfate, alkali metal bicarbonates, and the like. The nucleating agents improve the physical form and stability of the final composition. Their principal advantage is to improve the friability of the solidified melt, facilitating mixture of the solidified melt with the remaining components desired in the final detergent composition.

Chlorine degradable polyethenoxy nonionic surfactant defoaming agents found useful herein are well known. For example, these materials are disclosed in U.S. Pat. No. 2,674,619 and appear generally as compounds having the formula:

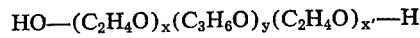

where y equals at least 15; and $(C_2H_4O)_{z+z'}$ equals 20–90%, of the total weight of the compound. Additional useful defoaming agents are disclosed in U.S. Pat. No. 2,380,166 and appear generally as a mixture of a lipophilic partial ester of a long chain fatty acid and a hydrophilic polyhydroxylic organic compound, and a highly hydrophilic hydroxypolyoxyethylene ether of a lipophilic partial ester of a long chain fatty acid and a hydrophilic polyhydroxylic organic compound.

U.S. Pat. No. 2,856,434 also describes defoaming agents useful herein. This patent discloses benzyl ethers of alkylphenoxy polyethoxyethanols having the formula:

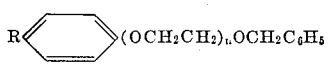

wherein R is an alkyl group of eight to fifteen carbon atoms and $n$ is an integer from twelve to forty. Polyoxyalkylene surfactants described in U.S. Pat. No. 2,677,700 are also usefully employed herein. These surfactants appear to be a cogeneric mixture of compounds having the formula:

$$Y(\text{oxypropylene})_n EH$$

wherein Y is a residue of an organic compound containing one active hydrogen atom capable of reacting with 1,2 propylene oxide, $n$ is an integer, and E is a polyoxyalkylene chain wherein the oxygen/carbon atom ratio is equal to or greater than 0.50; and E constituting 25–95%, by weight, of the mixture.

U.S. Pat. No. 2,673,882 also describes defoaming agents useful herein. These materials are described to be mixed polyoxyalkylene ethers of hexitols represented by the following formula:

$$R([O(CH_2)_x]_m[O(CH_2)_y]_nOH)_6$$

wherein R is the residue of a hexitol; $x$ and $y$ represent 2 or 3 and are of different values; $m$ and $n$ each represents an integer above 6 and below about 35 and the ratio of $m{:}n$ lies within the limits of from 3:1 to 1:3. Alkylphenoxy polyoxyethylene ethanols produced by reaction of an alkylphenol with ethylene oxide; and the oxyalkylated glycerols, produced by reaction with glycerol of a mixture of ethylene and propylene oxides are also useful defoaming agents. Yet additionally useful defoaming agents, representing a preferred group, are those having the formula:

$$RO(C_3H_6O)_x(C_2H_4O)_yH$$

wherein R represents an alkyl group of 1 to about 15 carbon atoms and $x$ and $y$ represent a positive number from 2 to 98. Acetylenic glycol, 2,4,7,9-tetramethyl-5-decyne 4,7 diol type compounds as well as ethylene oxide condensates with addition product of propylene oxide and ethylenediamine are also usefully employed herein. The composition of the latter group of addition products appears to have the general formula:

$$[H(C_2H_4O)_y(C_3H_6O)_x]_2NCH_2$$
$$CH_2N[(C_3H_6O)_x(C_2H_4O)_yH]_2$$

wherein $x$ and $y$ are positive numbers from 2 to 48.

The composition of the present invention may contain, in addition to the above nonionic surfactants, diglycol laurate, an anionic defoaming agent.

A defoaming chlorine degradable polyethenoxy nonionic surfactant defoaming agent as used herein is defined as a material which will decrease foam height at least 10 percent as measured by the Defoamer Test. In this test 0.015 gram of the agent is dissolved in 500 milliliters of water heated to 70° C. This solution is added to a Waring Blendor containing 1.0 gram of a non-fat dried milk and 1.5 grams of chlorinated trisodium phosphate, and the components are mixed for 30 seconds. The water, non-fat dried milk, and chlorinated trisodium phosphate, alone, give a foam height of about 3.5 inches.

Suitable water-soluble condensed alkali metal phosphates include the sodium and potassium pyrophosphates, metaphosphates and pyrophosphates such as sodium tripolyphosphate, sodium hexametaphosphate, tetrasodium pyrophosphate, the corresponding potassium phosphates, and the like.

The melt mixture is prepared by heating components at a temperature above the melting point of the sodium metasilicate pentahydrate and up to about 100° C. Preferably, the composition is heated up to a temperature below 90° C. The composition should be throughly mixed before heating, and agitation may be provided during heating to insure uniform heating.

The melt is then solidified by cooling. The solidified melt is then preferably granulated before being mixed with other components desired in the detergent. If a nucleating agent such as soda ash and/or a condensed phosphate is present in the melt, it is easily broken up by ordinary mixing or simple grinding by methods conventional in the art.

The cooled melt is then mixed with the remaining ingredients required in the final detergent composition. Chlorine release agents are added in this stage.

Chlorine release agents useful herein are compounds which release chlorine upon contact with an aqueous system. Suitable chlorine releasing agents include chlorinated trisodium phosphate, lithium hypochlorite, sodium hypochlorite and the like. Organic chlorine releasing agents found useful are chloramines including N-chloro sulfonamides, such as the sodium derivation of N-chloro-p-toluenesulfonamide, the sodium derivative of N-chlorobenzenesulfonamide, N,N - dichloro-p-toluenesulfonamide, and p-(dichlorosulfamyl)-benzoic acid. Also included are heterocyclic chloramines such as N-chlorosuccinimide and 1,3 - dichloro - 5,5-di-methylhydantoin; chlorinated condensed amines such as alpha,alpha'(chloroformamidine), and N-chloro anilides such as N-chloro-2, 6-dichloro-4-nitroacetanilide. Other organic chlorine release agents such as mono-, di- and tri-chlorocyanuric acids, potassium or sodium dichloroisocyanurates may also be used.

If greater concentrations of the melt components are desired in the final composition, they may be added to the solidified melt in this step. The cooled melt is mixed with quantities of the above ingredients, chlorine release agent, and calcium silicate required to provide the following composition, expressed as weight percents:

| Component | Operable | Preferred |
|---|---|---|
| Sodium metasilicate pentahydrate | 5–45 | 10–30 |
| Soda ash | 0–40 | 0–30 |
| Water-soluble condensed phosphate | 0–60 | 10–40 |
| Chlorine degradable polyethenoxy nonionic surfactant defoaming agent | 0.5–4 | 1–2 |
| Calcium silicate | 0–2 | 0–2 |
| Chlorine release agent, as an available chlorine | 1–5 | 1–5 |

If the total concentrations of the melt mixture ingredients desired in the final detergent composition are already present in the melt mixture, no additional quantity of the particular ingredient need be added to the last step.

The ingredients described above are the essential ingredients except where a zero concentration is set forth in the table. Other components such as water softeners, chelating agents, organic detergents, bactericides, and the like may be present in the composition of this invention and are contemplated therein since they are not considered essential to this invention.

The composition of this invention comprises, in general, the solidified melt component and the other additional components required to give the desired detergent composition, as described above with respect to the process. The essential feature of the composition is the presence of the chlorine degradable defoaming agent as a melt component with sodium metasilicate pentahydrate and the absence of the chlorine releasing agent from the melt. In other words, the chlorine releasing agent such as chlorinated trisodium phosphate is mixed with the solidified melt component.

The composition of this invention, in contrast to compositions of the prior art, exhibits substantially no chlorine degradation of the defoaming agent. Furthermore, the available chlorine in the chlorine releasing agent is substantially maintained. These advances are present even after prolonged storage of the composition of this invention.

The invention is further illustrated by the following specific, but non-limiting examples.

EXAMPLE 1

This example demonstrates the defoaming agent instability in simple blends containing a nonionic defoaming agent and a chlorine releasing agent. For comparison, four detergent compositions containing a nonionic defoamer in a melt with sodium metasilicate pentahydrate according to this invention were made and tested to demonstrate defoamer stability.

The control or blank sample was made by blending together soda ash and sodium tripolyphosphate, adding to the blend with continued mixing a defoaming agent having the general formula:

$$RO(C_3H_6O)_x(C_2H_4O)_yH$$

wherein R appears to be ethyl and $x$ and $y$ are selected such that the compound has a molecular weight of about 1200. This defoaming agent is commercially available as the trademarked product Makon NF-12 by Stephan Chemical Co. of Chicago, Ill. Thereafter was added successively with further blending, sodium metasilicate pentahydrate, calcium silicate and chlorinated trisodium phosphate.

The melt composition was formed by melting the sodium metasilicate pentahydrate in a beaker on a hot plate and adding the defoaming agent indicated to the melt. Other additional ingredients as indicated in Table A were added. After cooling, the remaining ingredients were mixed with the solidified melt using the same procedure followed in the blank sample.

The identity and concentrations of the ingredients in the melt and final mix are shown below in Table A.

TABLE A.—CONCENTRATION, WEIGHT PERCENT

| Ingredient | Sample No. | | | | |
|---|---|---|---|---|---|
|  | Blank | 1 | 2 | 3 | 4 |
| Solidified melt: |  |  |  |  |  |
| Sodium metasilicate pentahydrate | 0 | 15 | 15 | 15 | 10 |
| Defoaming agent "Makon NF-12" | 0 | 1 | 1 | 1 | 1 |
| Soda ash | 0 | 5 | 10 | 0 | 10 |
| Sodium tripolyphosphate | 0 | 4.5 | 0 | 11.5 | 0 |
| Sodium metasilicate, anhydrous | 0 | 0 | 0 | 0 | 5 |
| Sodium metasilicate pentahydrate | 15 | 0 | 0 | 0 | 0 |
| Defoaming agent Makon NF-12 | 1 | 0 | 0 | 0 | 0 |
| Soda ash | 10 | 5 | 0 | 10 | 0 |
| Sodium tripolyphosphate | 23 | 18.5 | 23 | 11.5 | 23 |
| Calcium silicate | 1 | 1 | 1 | 1 | 1 |
| Chlorinated trisodium phosphate | 50 | 50 | 50 | 50 | 50 |

The blank composition and samples 1–4 were then tested to determine defoamer stability. Additional tests were conducted after five and ten days storage at 38° C. The foam height was measured with each sample by heating 1.5 grams of the formulation to 70° C. in 500 milliliters of water, immediately adding this to a Waring Blendor containing 1.0 gram of a non-fat dried milk, mixing the components for 30 seconds in the blender, and then measuring the foam height as soon as a definite line of demarcation is observed in the aqueous mixture. The results obtained with the blank and samples 1–4 are shown in Table B below.

TABLE B

| Sample No. | Foam height, eighths of an inch | | | | |
|---|---|---|---|---|---|
|  | Blank | 1 | 2 | 3 | 4 |
| Storage time at 38° C., days: |  |  |  |  |  |
| 0 | 5 | 5 | 5 | 5 | 5 |
| 5 |  | 6 |  | 5 | 10 |
| 7 | 14 |  |  |  |  |
| 10 |  | 6 | 8 | 6 | 12 |
| 14 | 24 | 6 | 10 | 6 | 15 |
| 19 |  | 4 | 13 | 6 | 8 |
| 21 | 21 |  |  |  |  |
| 31 |  | 16 | 8 | 10 | 10 |
| 35 | 22 |  |  |  |  |
| 49 |  | 26 |  |  |  |
| 53 |  | 18 | 11 | 6 | 15 |
| 67 |  |  | 9 | 11 |  |

EXAMPLE 2

In this example, the samples were prepared as follows with the melt batch being prepared from the following quantities: 15 parts of sodium tripolyphosphate, 15 parts of sodium silicate pentahydrate and 1 part of the defoaming agent "Makon NF-12."

For sample 5, the defoamer was added to sodium tripolyphosphate at 80° C. and the sodium metasilicate pentahydrate was then added at 65° C. For sample 6, the defoamer was added to sodium tripolyphosphate at 80° C. and the sodium metasilicate pentahydrate was added at 55° C. In this sample the sodium metasilicate never melted. For sample 7, the defoamer was added to sodium metasilicate pentahydrate, already melted at 70–75° C., and this mix was added to sodium tripolyphosphate at 70° C.

The melt batches were then added to second mixes containing 50 parts of chlorinated trisodium, 10 parts of light soda ash, 1 part of calcium silicate and 8 parts of sodium tripolyphosphate. The foam heights after 38° C. storage for these samples were compared to those for a similar mixture formed by simple mixing of the same ingredients without any heating. The results are shown in Table C.

TABLE C

| Sample No. | Foam height, eighths of an inch | | | |
|---|---|---|---|---|
|  | Blank | 5 | 6 | 7 |
| Storage time at 38° C., days: |  |  |  |  |
| 0 | 5 | 5 | 5 | 5 |
| 7 | 14 | 8 | 20 | 13 |
| 14 | 24 | 10 | 18 | 12 |
| 21 | 22 | 12 | 20 | 9 |
| 28 | 22 | 12 | 19 | 12 |

The criticality of melting the sodium metasilicate is shown the similarity in results observed with the blank and sample 6; the sodium metasilicate was not melted in sample 6.

EXAMPLE 3

In preparing an additional sample, sample 8, a somewhat different method of obtaining a sodium metasilicate melt was used. One part of the defoaming agent Makon NF-12 was added to a mixture of 16.75 parts of tripolyphosphate at 25° C., and then sodium metasilicate pentahydrate, 8.25 parts, was added; the mixture was heated to 65° C. to insure melting of the sodium metasilicate pentahydrate. To the solidified mixture was then added a blend of 50 parts of chlorinated trisodium phosphate, 6.25 parts of sodium metasilicate pentahydrate, 10 parts of light soda ash, and 6.25 parts sodium tripolyphosphate. The overall composition of the entire formulation was the same as those in Examples 1 and 2. The stability upon storage is shown in Table D.

TABLE D

| | Foam height in eighths of an inch | |
|---|---|---|
|  | Blank | Sample 8 |
| Storage time at 38° C., days: |  |  |
| 0 | 5 | 6 |
| 7 | 14 | 10 |
| 14 | 24 | 14 |
| 21 | 22 | 16 |

This method gives an improved product, but it is evident from comparing sample 8 with samples 1 to 4, 5 and 7 that incorporation of larger amounts of sodium metasilicate pentahydrate to the melt mixtures provides a better product.

What is claimed is:

1. A process for forming a detergent composition having improved defoaming agent stability comprising
    (A) heating at a temperature of from 65° to 100° C. to melt a mixture containing the following essential ingredients, expressed as weight percents:
        (1) sodium metasilicate pentahydrate____ 5–45

(2) chlorine degradable polyethenoxy nonionic surfactant defoaming agent ..... 0.5-4
(3) water-soluble condensed sodium or potassium phosphate ............. 0-25

(B) solidifying the melt mixture by cooling; and
(C) mixing the cooled melt mixture with quantities of sodium metasilicate pentahydrate, chlorine degradable polyethenoxy nonionic surfactant defoaming agent, soda ash, water-soluble condensed sodium or potassium phosphate, chlorinated trisodium phosphate, and calcium silicate required to provide a composition having the following essential ingredients, expressed as weight percents:

(1) sodium metasilicate pentahydrate ... 5-45
(2) chlorine degradable polyethenoxy nonionic surfactant defoaming agent ... 0.5-4
(3) soda ash ............. 0-40
(4) water-soluble condensed sodium or potassium phosphate ............. 0-60
(5) calcium silicate ............. 0-2
(6) chlorinated trisodium phosphate .... 1-5

2. The process of claim 1 wherein the melt mixture contains from 0 to 20 percent soda ash and from 0 to 25 percent of a water-soluble condensed sodium or potassium phosphate, based on the weight of the final composition.

3. The process of claim 1 wherein the melt mixture contains the following essential ingredients, expressed as weight percents:

(1) sodium metasilicate pentahydrate ....... 10-30
(2) chlorine degradable polyethenoxy nonionic surfactant defoaming agent ........ 0.5-4
(3) soda ash ............. 0-10
(4) sodium tripolyphosphate ............. 0-10

4. The process of claim 1 wherein the cooled melt mixture is mixed with quantities of sodium metasilicate pentahydrate, chlorine degradable polyethenoxy nonionic surfactant defoaming agent, soda ash, water-soluble condensed sodium or potassium phosphate, chlorinated trisodium phosphate, and calcium silicate required to provide a composition containing the following essential ingredients, expressed as weight percents:

(1) sodium metasilicate pentahydrate ....... 10-30
(2) chlorine degradable polyethenoxy nonionic surfactant defoaming agent ........ 0.5-4
(3) soda ash ............. 0-30
(4) water-soluble condensed sodium or potassium phosphate ............. 10-40
(5) calcium silicate ............. 0-2
(6) chlorinated trisodium phosphate as available chlorine ............. 1-5

5. The process of claim 1 wherein the melt mixture is heated to a temperature of less than 90° C.

References Cited

UNITED STATES PATENTS 3,306,858  2/1967  Oberle ............. 252—99
3,352,785  11/1967  Corliss et al. ......... 252—99
3,359,207  12/1967  Kaneko et al. ......... 252—99
3,361,675  1/1968  Fuchs et al. .......... 252—99

MAYER WEINBLATT, Primary Examiner

U.S. Cl. X.R.

252—187